United States Patent
Schramm et al.

(10) Patent No.: US 11,371,633 B2
(45) Date of Patent: Jun. 28, 2022

(54) SWIVEL JOINT WITH COATED SURFACES

(71) Applicant: Caterpillar Inc., Deerfield, IL (US)

(72) Inventors: Zachary Alan Schramm, Antioch, IL (US); Bradley James Briars, Palatine, IL (US); Robert E. Riedel, Jr., Fox River Grove, IL (US)

(73) Assignee: Caterpillar Inc., Peoria, IL (US)

( * ) Notice: Subject to any disclaimer, the term of this patent is extended or adjusted under 35 U.S.C. 154(b) by 357 days.

(21) Appl. No.: 16/402,871

(22) Filed: May 3, 2019

(65) Prior Publication Data

US 2020/0347971 A1 Nov. 5, 2020

(51) Int. Cl.
*F16L 27/08* (2006.01)
*E21B 17/05* (2006.01)
*F16L 58/08* (2006.01)

(52) U.S. Cl.
CPC .......... *F16L 27/0828* (2013.01); *E21B 17/05* (2013.01); *F16L 27/0837* (2013.01); *F16L 58/08* (2013.01)

(58) Field of Classification Search
CPC ............... F16L 27/0824; F16L 27/0828; F16L 27/0837; F16L 58/08; F16L 58/18; E21B 17/05
USPC .................................................. 285/275, 276
See application file for complete search history.

(56) References Cited

U.S. PATENT DOCUMENTS

| | | | |
|---|---|---|---|
| 3,727,950 A * | 4/1973 | Swanson | F16L 27/0828 285/276 |
| 5,765,845 A | 6/1998 | Dawda et al. | |
| 6,164,707 A * | 12/2000 | Ungchusri | F16L 27/0824 285/276 |
| 6,904,661 B2 | 6/2005 | Zolnier et al. | |
| 9,175,720 B2 | 11/2015 | Adamczyk et al. | |
| 2007/0256864 A1* | 11/2007 | Robichaux | E21B 17/05 |
| 2014/0096858 A1* | 4/2014 | Nam | F16L 58/08 |
| 2014/0099494 A1 | 4/2014 | Choi et al. | |
| 2015/0114720 A1 | 4/2015 | Ferguson et al. | |
| 2015/0322719 A1 | 11/2015 | Sue et al. | |
| 2016/0153596 A1* | 6/2016 | Ungchusri | F16L 27/0828 285/276 |
| 2017/0299096 A1 | 10/2017 | Nowell et al. | |
| 2019/0137019 A1* | 5/2019 | Nowell | E21B 17/05 |
| 2020/0109804 A1* | 4/2020 | Nguyen | F16L 27/0828 |

FOREIGN PATENT DOCUMENTS

| | | | | |
|---|---|---|---|---|
| CN | 201842883 | | 5/2011 | |
| CN | 103628020 | | 3/2014 | |
| GB | 1307180 A | * | 2/1973 | ....... F16L 27/0824 |

* cited by examiner

*Primary Examiner* — Zachary T Dragicevich
(74) *Attorney, Agent, or Firm* — Lee & Hayes, PLLC (57) ABSTRACT

A swivel joint includes a first pipe section and a second pipe section. The pipe sections may define a flow path via which fluid passes through the swivel joint. One or more surfaces proximate a junction of the first pipe section and the second pipe section may be selectively coated to resist wear from erosion, corrosion, and or abrasion.

19 Claims, 6 Drawing Sheets

SWIVEL JOINT WITH COATED SURFACES

TECHNICAL FIELD

This disclosure relates generally to joints for fluid systems, and, more specifically, to a swivel joint for connecting flow lines and equipment and/or carrying high pressure fluids.

BACKGROUND

Some conventional swivel joints are used in oil and gas applications, e.g., fracking applications, to promote attachment of rigid flow lines to each other and/or to equipment and/or other components. In some examples, swivel joints can be used to correct for misalignment when connecting transfer flow lines, discharge lines, test lines, manifolds, tanks, pumps, tankers, or the like. In some instances, swivel joints can also be used to transfer fluids at higher pressure, e.g., up to 15,000 psi. Such fluids may be highly caustic and/or may include particulate matter and/or other contaminants. However, because of the high pressure of the fluids being transferred, the presence of particulates and other contaminants in the fluids, and/or otherwise caustic properties, interior surfaces of conventional swivel joints can wear, and in some instances, fail, extremely quickly. For instance, surfaces proximate a seal between two pipe sections meeting at the swivel joint can be subjected to excessive erosion, abrasion, and/or corrosion that results in premature failure. Accordingly, it may be useful to provide an improved, robust swivel joint that wears less rapidly than conventional designs.

An example conventional swivel joint is described in U.S. Patent Application Publication No. 2017/0299096 (hereinafter referred to as the '096 reference). In particular, the '096 reference describes a swivel joint that includes a female portion and a male portion receivable in the female portion. In the '096 reference, the female portion includes a recessed internal face configured to abut an end face of the male portion. The female portion and/or the male portion include(s) a groove spaced axially from the associated face(s) and one or more radial seals are disposed in the groove(s). The '096 reference recognizes that areas proximate the abutting faces can corrode or erode, but attempts to solve this problem by removing a seal conventionally located between these abutting faces and opts instead for a radial seal axially spaced from the abutting surfaces, i.e., out of the flow path. The '096 reference does not, however, disclose details related to a swivel joint having selectively coated surfaces to reduce early failures from corrosion, erosion, abrasion, or the like. The '096 reference also does not disclose an easily-manufactured swivel joint with extended life. As a result, the techniques described in the '096 reference may fail to prevent wear at critical surfaces in a swivel joint.

Example embodiments of the present disclosure are directed toward overcoming the deficiencies described above.

SUMMARY

In an aspect of the present disclosure, a swivel joint can include a first pipe section, a second pipe section, a seal, and a coating. The first pipe section can include a first pipe inlet; a first pipe outlet; a first pipe outlet face circumscribing the first pipe outlet; a first pipe bore extending from the first pipe inlet to the first pipe outlet, and a first bearing race section proximate the first pipe outlet. The first pipe bore includes a first pipe outlet section proximate the first pipe outlet and having a first pipe outlet diameter, a first pipe main bore section between the first pipe inlet and the first pipe outlet section and having a first pipe main bore diameter smaller than the first pipe outlet diameter, and a first transition section extending between the first pipe main bore section and the first pipe outlet section. The second pipe section includes a second pipe inlet; a second pipe outlet; a second bearing race section proximate the second pipe inlet and configured to cooperate with the first bearing race section of the first pipe section to allow rotation of the first pipe section relative to the second pipe section. The seal is disposed between and in contact with the first pipe outlet face and a second pipe inlet face circumscribing the second pipe inlet. The coating is on at least one of the first pipe outlet face, the first pipe outlet section, and at least a portion of the first transition section. The first pipe main bore section and the first bearing race section are substantially free of the coating.

In another aspect of this disclosure, a pipe section for use in a swivel joint can include a pipe inlet; a pipe outlet; a pipe outlet face circumscribing the pipe outlet; a pipe bore extending from the pipe inlet to the pipe outlet, a bearing race section, and a coating. The pipe bore can include a pipe main bore section extending at least partially between the pipe inlet and the pipe outlet, and an outlet section extending between the pipe main bore section and the pipe outlet. The bearing race section can be proximate the pipe outlet and can be configured to cooperate with a bearing race section of a second pipe section. The coating on the pipe outlet face and at least a portion of the outlet section.

In yet another aspect of this disclosure, a method of manufacturing a first pipe section for use in a swivel joint is disclosed. The first pipe section can include a first bearing race configured to cooperate with a second bearing race of a second pipe section to allow for rotational movement of the first pipe section relative to the second pipe section. The first pipe section can include a first pipe inlet; a first pipe outlet; a first pipe bore extending from the first pipe inlet to the first pipe outlet; and a first pipe outlet face circumscribing the first pipe outlet. The first pipe bore can include a first pipe outlet section proximate the first pipe outlet and having a first pipe outlet diameter, a first pipe main bore section between the first pipe inlet and the first pipe outlet section and having a first pipe main bore diameter smaller than the first pipe outlet diameter, and a first transition section connecting the first pipe main bore section and the first pipe outlet section. The method can include applying a coating to the first pipe outlet face; applying the coating to the first pipe outlet section; and applying the coating to at least a portion of the first transition section. The first pipe main bore section and the first bearing race are substantially free of the coating.

DETAILED DESCRIPTION

This disclosure generally relates to swivel joints, which generally include two pipe sections that are rotatable relative to each other. The swivel joints described herein may be used in high pressure and/or high flow rate applications such as in oil and gas, fracking, and/or other operations. Wherever possible, the same reference numbers will be used through the drawings to refer to the same or like features.

Figure 1:
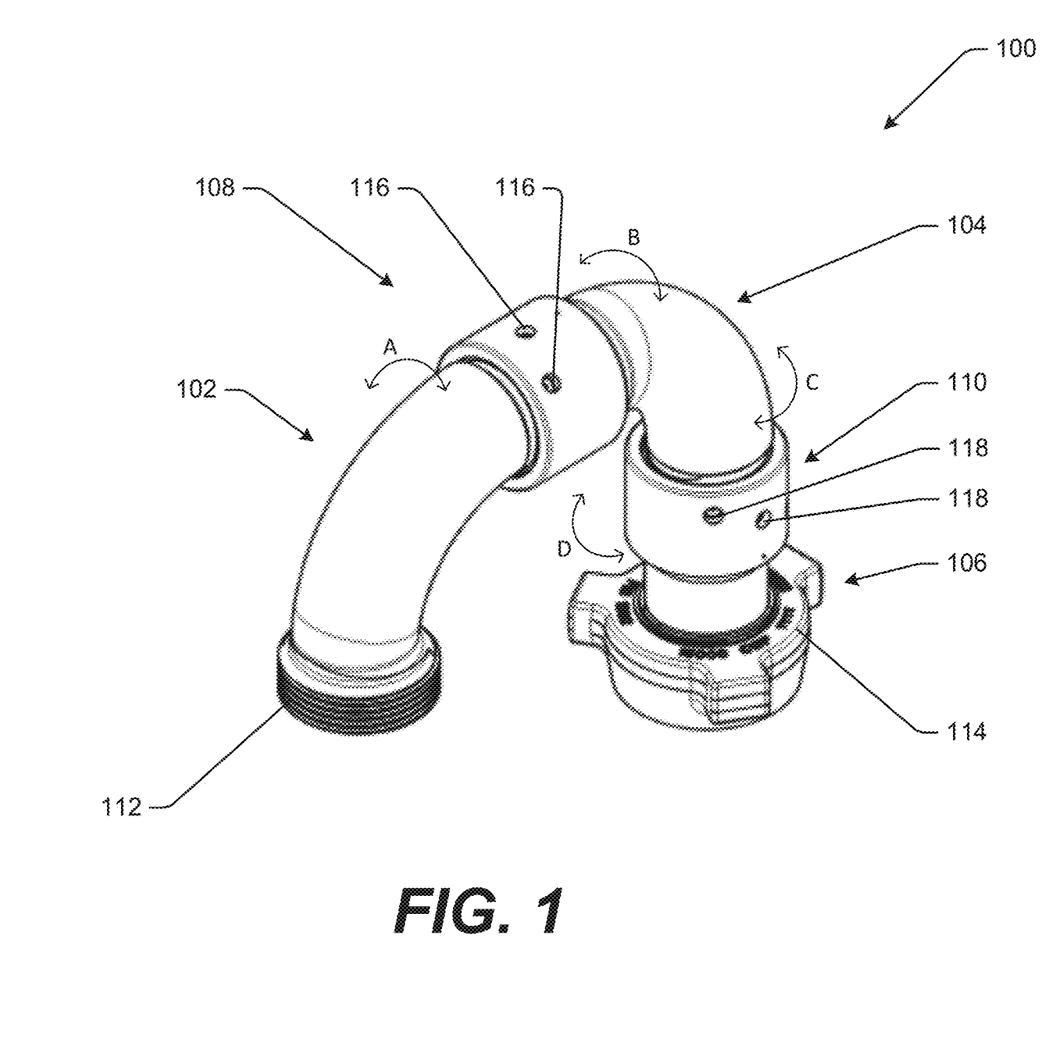
FIG. 1 is a perspective view of a swivel joint, in accordance with an example embodiment of the present disclosure.

Referring to FIG. 1, an example swivel joint 100 generally includes a plurality of pipe sections configured to move rotationally relative to each other. Specifically, the swivel joint 100 includes a first pipe section 102, a second pipe section 104, and a third pipe section 106. As detailed further herein, each of the first pipe section 102, the second pipe section 104, and the third pipe section 106 may be a tubular member, such that the first pipe section 102, the second pipe section 104, and the third pipe section 106 may together form a fluid passageway extending through the swivel joint 100. As also illustrated, the first pipe section 102 and the second pipe section 104 are generally arcuate, whereas the third pipe section 106 is generally straight. The sizes and shapes illustrated are for example only. As will be known to those skilled in the art, the swivel joint 100 may include more or fewer components having the same, similar, or different shapes than those illustrated, depending upon the application. In some instances, types or styles of swivel joints may be configured to include different combinations of two or more pipe sections, like the pipe sections 102, 104, 106.

As also illustrated in FIG. 1, a first junction 108 is provided between the first pipe section 102 and the second pipe section 104. Moreover, a second junction 110 is provided between the second pipe section 104 and the third pipe section 106. The junction 108 and the junction 110 may be substantially identical and, generally, may include features that allow for a relative rotation of pipe sections 102, 104, 106 meeting at the respective junctions 108, 110. Stated differently, the first junction 108 allows for rotational movement of the first pipe section 102 relative to the second pipe section 104, e.g., about arc A illustrated in FIG. 1. The first junction 108 also allows for rotational movement of the second pipe section 104 relative to the first pipe section 102, e.g., about the arc B. Similarly, the second junction 110 allows for rotation of the second pipe section 104 relative to the third pipe section 106, e.g. about the arc C and for rotational movement of the third pipe section 106 relative to the second pipe section 104, e.g., about the arc D, also illustrated in FIG. 1.

As described in more detail below, the first junction 108 generally includes a cooperation of a male bearing race section on an exterior surface of the first pipe section 102 and a female bearing race section on an interior surface of the second pipe section 104. The bearing race sections are described in detail below, with reference to FIGS. 3 and 4. In FIG. 1, two first bearing apertures 116 are shown in the female bearing race section of the second pipe section 104. The bearing apertures 116 provide access to bearing races formed at the junction 108, detailed further herein. Similarly, the second junction 110 includes bearing apertures 118 at a female portion of the third pipe section 106. The bearing apertures 118 provide access to bearing races formed between a male bearing race section of the second pipe section 104 and a female bearing race section of the third pipe section 106.

The swivel joint 100 may be configured for attachment to one or more lines, conduits, hoses, manifolds, and/or other equipment. Thus, in the example of FIG. 1, the swivel joint 100 includes a first connecting structure 112 at an end of the first pipe section 102 opposite the junction 108 and a second connecting structure 114 at an end of the third pipe section 106 opposite the second junction 110. The first connecting structure 112 is illustrated as a plurality of threads formed on an exterior of the first pipe section 102, and the second connecting structure 114 is illustrated as a nut, e.g., a hammer nut. Although not illustrated in FIG. 1, but as will be described further below in connection with FIGS. 3 and 5, the hammer nut may include a plurality of threads formed on an interior surface. The first connecting structure 112 and the second connecting structure 114 are for example only. Depending upon the application and/or the equipment to which the swivel joint 100 is to be connected, different modalities of the connecting structures 112, 114 may be used. Some nonlimiting examples of connecting structures can include male or female threads formed on the pipe sections 102, 106 and/or on a nut or similar attachment mechanism. Threads can include straight threads, tapered threads, e.g., National Pipe Thread taper (NPT) threads, or the like. Other, non-threaded connections may also be used in embodiments.

Figure 2:
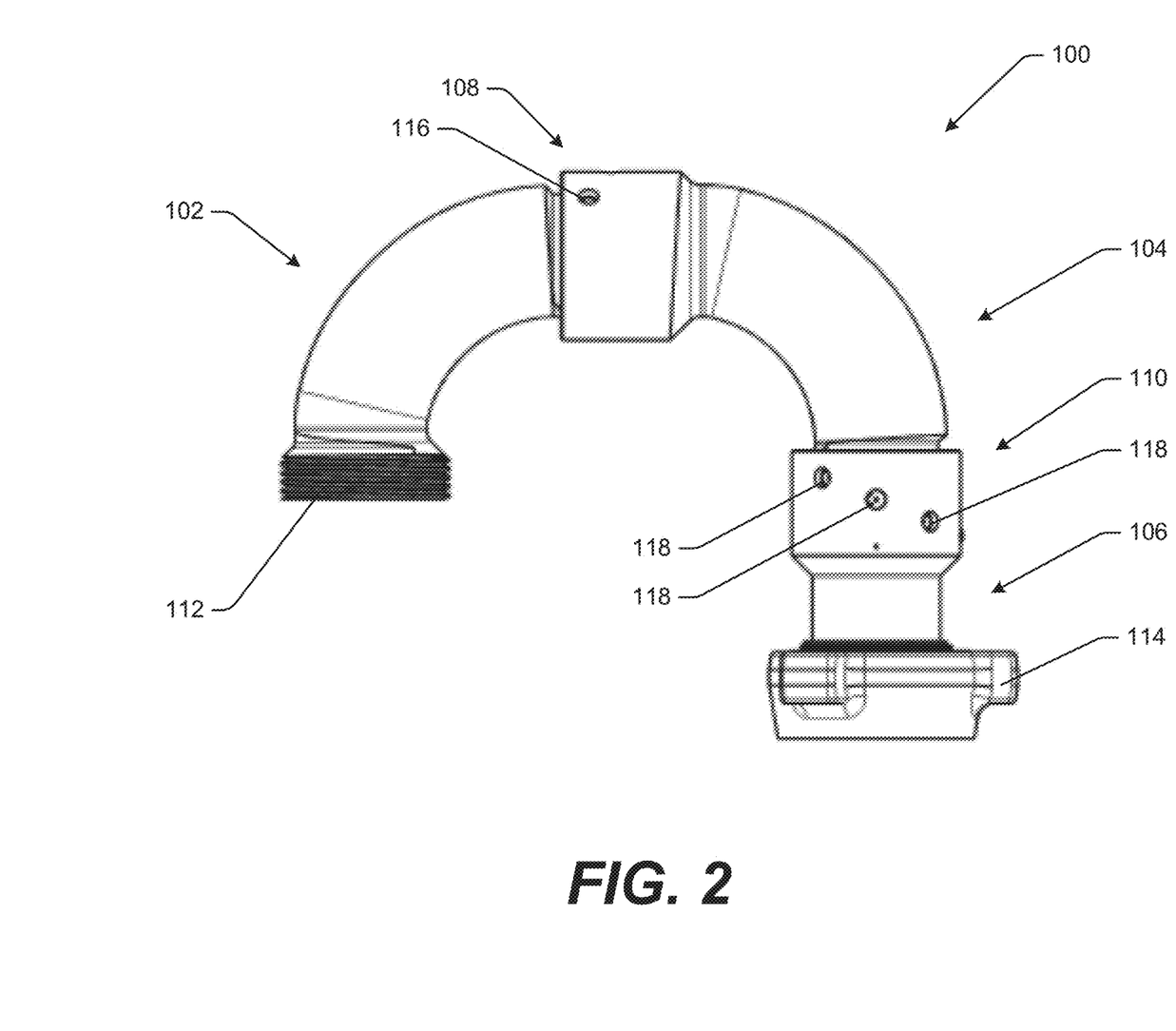
FIG. 2 is a side view of the swivel joint illustrated in FIG. 1, in accordance with an example embodiment of the present disclosure.

FIG. 2 is a side view of the swivel joint 100 illustrated in FIG. 1 and the same reference numerals are used to show the same features. As better illustrated in FIG. 2, the first pipe section 102 is a generally arcuate section having a generally continuous radius, for about 90°. Similarly, the second pipe section 104 is a generally arcuate section, also having a bend of about 90°. The third pipe section 106 is substantially straight. As noted above, the first pipe section 102, the second pipe section 104, and the third pipe section 106 are for example only.

As also illustrated in FIG. 2, the second junction 102 includes three bearing apertures, e.g., the bearing apertures 118 visible in FIG. 1 and a third bearing aperture 118. In implementations, a number of bearing apertures may correspond to a number of bearing races with each of the bearing apertures 118 allowing access to one of the bearing races. In this manner, one or more bearings can be inserted into (or removed from) the bearing races via the bearing apertures 118. In the illustrated example, the second junction 110 may include three bearing races, a first accessible by the left- and top-most (as viewed in FIG. 4) bearing aperture 118, a second accessible by the central bearing aperture 118, and a third accessible by the right- and bottom-most bearing aperture 118. The first junction 108 may similarly have three bearing races, e.g., accessible by three bearing apertures 116. However, in other implementations, the first junction 108 and/or the second junction 110 may include more or fewer bearing races. Although not illustrated in FIGS. 1 and 2, a clip or other retaining mechanism may be disposed in the bearing apertures 116, 118, e.g., to retain bearings in the bearing races.

Figure 3:
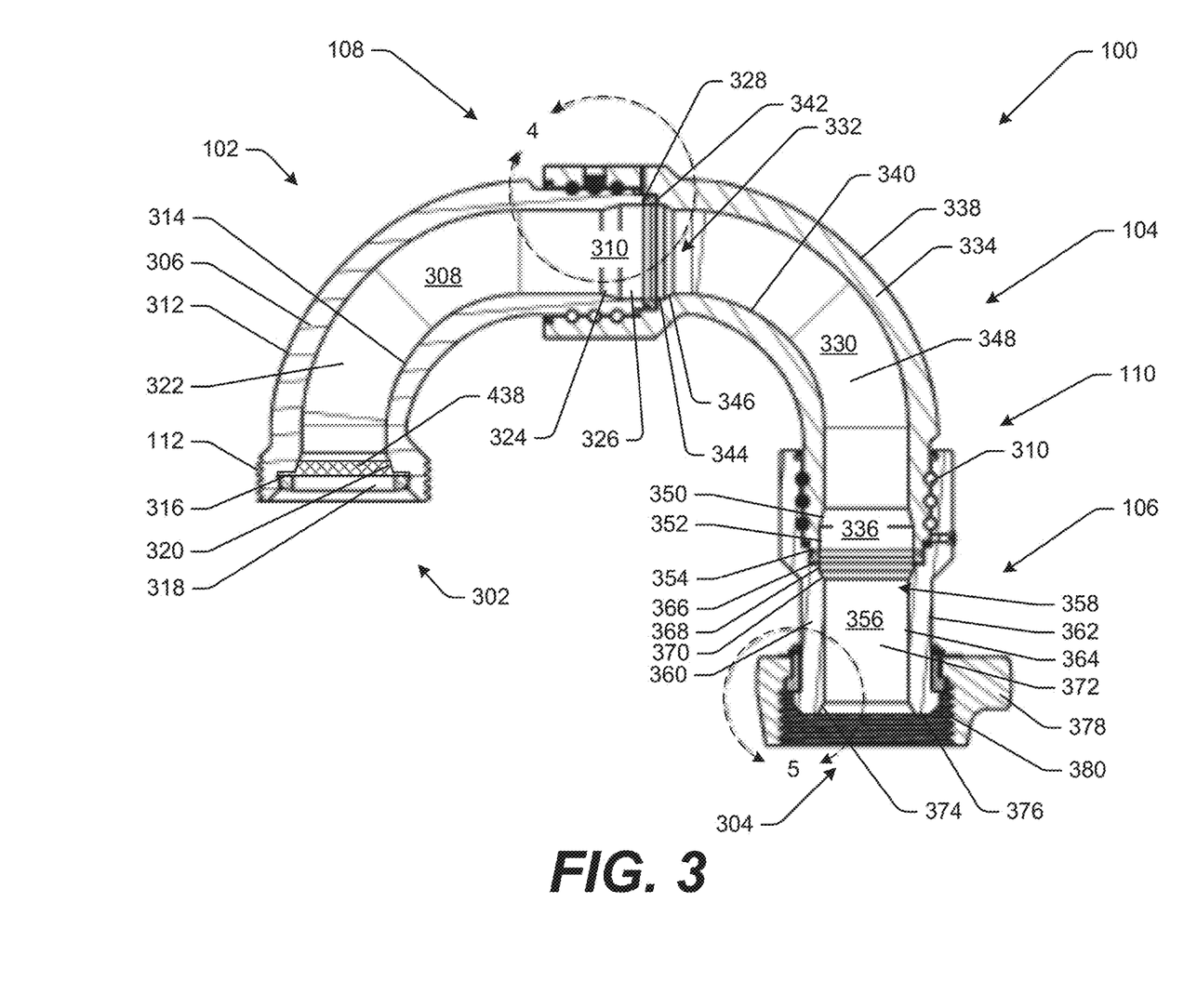
FIG. 3 is a side, cross-sectional view of the swivel joint of FIGS. 1 and 2, in accordance with an example embodiment of the present disclosure.

FIG. 3 is a cross-sectional view of the swivel joint 100 and illustrates additional aspects of this disclosure. For example, FIG. 3 better illustrates that each of the first pipe section 102, the second pipe section 104, and the third pipe section 106 is a tubular member generally defining a passageway or bore through which a fluid may flow. For example, the first pipe section 102 generally defines an inlet 302 for the swivel joint 100 proximate the first connecting structure 112 and the third pipe section 106 generally defines an outlet 304 for the swivel joint 100 proximate the second connecting structure 114. In this manner, the swivel joint 100 may be configured for fluid to flow from the inlet 302 to the outlet 304. However, this flow configuration may be for example only. In some implementations, the swivel joint 100 may also be suitable for flow in an opposite direction, e.g., in which the inlet 302 would be the outlet and the outlet 304 would be the inlet for fluid passing through the swivel joint 100.

As detailed in FIG. 3, the first pipe section 102 generally includes an annular wall 306 defining a first pipe bore 308 extending from the inlet 302 to a first pipe outlet 310 (proximate an inlet of the second pipe section 104). The annular wall 306 may have a thickness defined as a distance between an outer surface 312 of the annular wall 306 and an inner surface 314 defining the radial extents of the first pipe bore 308. As illustrated and described further herein, the thickness may vary along the length of the first pipe section 102, e.g., because the first pipe bore 308 may have a variable diameter.

In the illustrated example, the first pipe bore 308 includes, proximate the inlet 302, an inlet face 316 disposed generally perpendicular to a direction of flow at the inlet 302. A side of a gasket or seal 318 may abut the inlet face 316. Although not illustrated, when the swivel joint 100 is attached to a piece of equipment, e.g., via the first connection structure 112, a fixed portion of the equipment will contact an opposite side of the seal 318. Assuming a flow path from the inlet 302 to the outlet 304, downstream of the inlet face 316 is a first transition section 320 of the first pipe bore 308. The first transition section 320 serves as a neck or reduction in the first bore 308, e.g., to a main bore section 322. A second transition section 324 may also be provided at a downstream end of the main bore section 322. The second transition section 324 may provide an expansion to an outlet section 326 proximate the outlet 310. The first pipe bore 308 may terminate proximate the outlet 310 and an outlet face 328 may circumscribe the outlet 310. For example, the outlet face 328 may be substantially perpendicular to the direction of flow of fluids exiting the outlet 310 (or entering the first pipe bore 308 when flow is reversed).

In the illustrated embodiment, the main bore section 322 may have a generally constant, e.g., reference, diameter along its length and extends generally along the length of the first pipe section 102. Stated differently, the first pipe bore 308 generally includes the main bore section 322 between the inlet 302 and the outlet 310, with the first transition section 320 proximate the inlet 302 and the second transition section 324 and the outlet section 326 proximate the outlet 310 having an increased diameter. Moreover, although illustrated as having a generally constant diameter, in some implementations the main bore section 322 may not have a constant diameter, e.g., the diameter may vary between or among the arcuate sections and/or relatively straight sections. Also in the illustrated embodiment, the outlet section 326 has a generally constant diameter. In implementations, the diameter of the outlet section 326 may be greater than the diameter of the main bore section 322, regardless of whether the main bore section 322 has a constant diameter or a variable diameter along its length. Moreover, in some implementations, the outlet section 326 may be removed, e.g., as at the inlet 302, such that the transition section 324 extends from the main bore section 322 to the outlet face 328.

Also in examples, the first pipe bore 308 may be differently configured. By way of non-limiting example, sections of the first pipe bore 308 may have diameters other than those illustrated. For instance, and without limitation, the inlet 302 may have a diameter substantially the same as the first transition section 320 (in which case the first transition section 320 may be unnecessary and/or may generally have a constant diameter). Moreover, the outlet section 326 and/or the second transition section 324 may have a diameter substantially the same as a diameter of the main bore section 322. Also in examples, one or more of the inlet 302, the outlet 310, and/or the outlet section 326 have a diameter smaller than at least a portion of the main bore section 322. Generally, techniques described herein may be used on pipe section of different sizes and configurations.

Fluid exiting the first pipe section 102 via the outlet 310 enters a second pipe bore 330 via an inlet 332 of the second pipe section 104. More specifically, the second pipe section 104 generally includes an annular wall 334 defining the second pipe bore 330 and extending from the inlet 332 to a second pipe outlet 336 (proximate an inlet of the third pipe section 106). The annular wall 334 may have a thickness defined as a distance between an outer surface 338 of the annular wall 306 and an inner surface 340 defining the radial extents of the second pipe bore 330. As illustrated and described further herein, the thickness may vary along the length of the second pipe section 104.

As further illustrated in FIG. 3, the second pipe bore 330 includes, proximate the inlet, an inlet face 342 generally circumscribing the inlet 332. The inlet face 342 may be generally perpendicular to the direction of fluid flow through the inlet 332. Moreover, the inlet face 342 may be generally parallel to the outlet face 328 when the swivel joint 100 is assembled. As discussed below, a seal, such as a packing seal, may be retained between the inlet face 342 and the outlet face 328. Also at the inlet, the second pipe bore 330 may include an inlet section 344. For example, the inlet section 344 may have a substantially constant diameter, and the diameter may approximate the diameter of the outlet section 326 of the first pipe bore 308.

Downstream of the inlet section 344, in some examples, the second pipe bore 330 may include a first transition section 346 that acts as a reduction or neck to a main bore section 348. At a downstream end of the main bore section 348, a second transition section 350 may provide an expansion to an outlet section 352 proximate the outlet 336. The second pipe bore 330 may terminate proximate the outlet 336 and an outlet face 354 may circumscribe the outlet 336. For example, the outlet face 354 may be substantially perpendicular to the direction of flow of fluids exiting via the outlet 336.

As with the first pipe main bore section 322, the second pipe main bore section 348 may have a generally constant diameter along its length and may extend generally along the length of the second pipe section 102. That is, the second pipe bore 330 generally includes the main bore section 348 between the inlet 332 and the outlet 336, with sections proximate the inlet 332 and the outlet 336 having an increased diameter. Moreover, although illustrated as having a generally constant diameter, in some implementations the main bore section 348 may not have a constant diameter, for example, the diameter may vary between or among the arcuate sections and/or relatively straight sections. Also in the illustrated embodiment, the inlet section 344 and the outlet section 352 may have generally constant diameters, and in some instances, those diameters may be substantially the same. In implementations, the diameters of the inlet section 344 and/or of the outlet section 352 may be greater than the diameter of the main bore section 348, regardless of whether the main bore section 348 has a constant diameter or a variable diameter along its length. In other examples, however, the diameter(s) of the inlet section 344 and/or the outlet section 352 may be smaller than, or the same as, the diameter of the main bore section 348. Stated differently, techniques described herein may be used on pipe bores with varying profiles and/or with pipe bores having variable or changing profiles.

Fluid exiting the second pipe section 104 via the outlet 336 enters a third pipe bore 356 via an inlet 358 of the third pipe section 106. More specifically, and like the first and second pipe sections 102, 104, the third pipe section 106 generally includes an annular wall 360 defining the third pipe bore 356 extending from the inlet 358 to the outlet 304. The annular wall 360 may have a thickness defined as a distance between an outer surface 362 of the annular wall 360 and an inner surface 364 defining the radial extents of the third pipe bore 356. As illustrated and described further herein, the thickness may vary along the length of the third pipe section 104.

As further illustrated in FIG. 3, the third pipe bore 356 includes, proximate the inlet 358, an inlet face 366 generally circumscribing the inlet 358. The inlet face 366 may be generally perpendicular to the direction of fluid flow through the inlet 358. Moreover, the inlet face 366 may be generally parallel to the outlet face 354 of the second pipe section 104 when the swivel joint 100 is assembled. Also at the inlet 358, the third pipe bore 356 may include an inlet section 368. For example, the inlet section 368 may have a substantially constant diameter, and the diameter may approximate the diameter of the outlet section 352 of the second pipe bore 330.

Downstream of the inlet section 368, the third pipe bore 356 may include a first transition section 370 that acts as a reduction or neck to a main bore section 372. At a downstream end of the main bore section 372, a second transition section 374 may provide an expansion to the outlet 304. An outlet face 376 may circumscribe the outlet 304. For example, the outlet face 376 may be substantially perpendicular to the direction of flow of fluids exiting via the outlet 304. Although in the illustration the third pipe bore 356 is relatively wider proximate the inlet face 366 and the outlet face 376, other configurations are contemplated. For instance, the diameter proximate the inlet 358 and/or the diameter proximate the outlet 304 may alternatively be the same as or smaller than the diameter of the main bore section 372.

As also illustrated in FIG. 3, the second connection structure 114 can include a nut 378 having threads 380 formed on an inner surface. The second connection structure 114 is shown in more detail in FIG. 5, and will be described further in connection with that figure.

As described above, the first junction 108 allows for relative rotation of the first pipe section 102 and the second pipe section 104, and the second junction 110 allows for relative rotation of the second pipe section 104 and the third pipe section 106.

Figure 4:
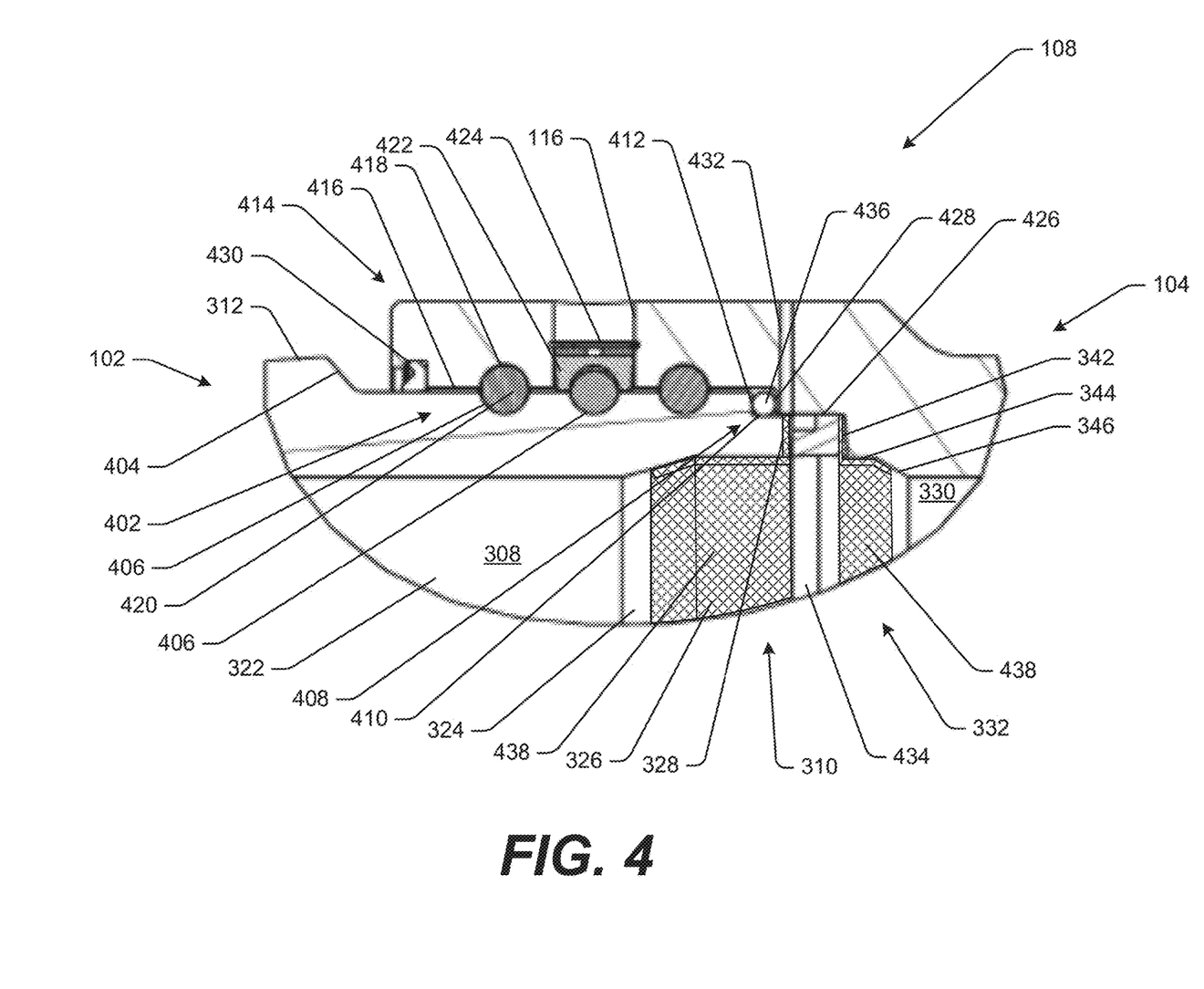
FIG. 4 is a detailed view of a portion of the swivel joint of FIG. 3, in accordance with an example embodiment of the present disclosure.

FIG. 4 provides additional details of the first junction 108. FIG. 4 is an enlarged view of the portion of FIG. 3 identified by the section arc 4-4 showing a segment of the first pipe section 102 and a segment of the second pipe section 104. More specifically, FIG. 4 illustrates a portion of the first pipe section proximate the outlet 310 and the cooperating portion of the second pipe section 104, e.g., including the inlet 332. As illustrated in more detail, the outer surface 312 of the first pipe section 102 is configured to include a male bearing race section 402. In the illustration, the outer surface 312 includes a step 404 that causes a portion of the male bearing race section 402 to have a reduced outer diameter, e.g., relative to the remainder or the first pipe section 102. In this reduced diameter section, a plurality (three in the illustrated embodiment) of annular tracks or races 406 are formed in the outer surface. As illustrated, the races 406 are generally arcuate in cross-section, and may approximate semi circles in some embodiments. As also illustrated, the male bearing race section 402 may include an annular notch 408 proximate the outlet face 328. The annular notch 408 may define an annular surface 410 and a secondary face 412. Accordingly, the secondary face 412 may be generally parallel to, and spaced axially from, the outlet face 328.

The second pipe section 104 includes a female bearing race section 414 generally shaped as a flange or bell that has an inner diameter sized to receive the male bearing race section 402 therein. As illustrated in FIG. 4, the female bearing race section 414 includes an inner surface 416 in which a plurality of annular grooves or races 418 are formed. The races 418 correspond in number, and generally in size and profile, to the races 406 formed in the male bearing race section 402. When assembled, the races 418 align with the races 406 to form enclosed annular tracks in which one or more bearings 420 are disposed. In operation, the bearings 420 are free to move in the tracks formed by the races 406, 418, allowing for rotation of the first pipe section 102 relative to the second pipe section 104.

As also illustrated in FIG. 4, the first bearing aperture 116 is formed at least partially through one of the races 418 of the female bearing race section 414. As illustrated, the first bearing aperture 116 is wider than the bearing race 418. In the illustration, a bearing block 422 is configured for placement in the bearing aperture 116, and a retention clip 424 retains the bearing block 422 in position in the bearing aperture 116. In implementations, the retention clip 424 may be removable to facilitate insertion and/or removal of the bearing block 422 and/or the bearings 420 to/from the corresponding bearing race.

As illustrated in FIG. 4, the second pipe section 104 may also include additional features. For example, the second pipe section 104 may have a stepped profile between the inlet face 342 and the inner surface 412. More specifically, the second pipe section 104 includes an annular surface 426 extending generally axially from the inlet face 342 and a secondary face 428 generally perpendicular to the annular surface 426 and parallel to the inner surface 412. As also illustrated, the female bearing race section 414 can include a receptacle or groove 430 disposed proximate a distal end of the inner surface 416. The groove 430 may be configured to retain a seal, such as a wiper seal, therein, e.g., to inhibit external contaminants from entering the bearing races and/or to retain lubrication in the bearing races. The female bearing race section 414 can also include a leak detection port 432, which may be a channel or other passageway extending from a position on the annular surface 426 to an exterior surface of the second pipe section 104. In some examples, malfunctioning of the swivel joint 100 can be detected when fluid, such as lubrication fluid or fluid to be transferred, weeps from the leak detection port 432.

As noted above, when assembled, the male bearing race section 402 of the first pipe section 102 is received in the female bearing race section 414 of the second pipe section 102 such that the races 406 align with the races 418. Moreover, when assembled, the outlet face 328 of the first pipe section 102 and the inlet face 342 of the second pipe section 104 are substantially parallel to, and spaced from, each other. A first gasket or seal 434 is positioned between the outlet face 328 and the inlet face 342. For instance, the first seal 434 may comprise an elastomeric material compressed between the outlet face 328 and the inlet face 342, and may act as a primary or packing seal between the first pipe section 102 and the second pipe section 104. Also in the illustrated embodiment, the secondary face 428 of the female bearing race section 414 is arranged to be substantially parallel to, and spaced from, the secondary face 412 of the male bearing race section 402. A second gasket or seal 436 is positioned between the secondary faces 412, 428. In operation, should the first seal 434 fail, fluid passing through the swivel joint 100 may leak past the first seal 434 and exit the swivel joint 100 via the leak detection port 432. However, because of the presence of the secondary seal, the fluid may not impact the bearing races. Similarly, should the second seal 436 fail, lubricating fuel in the bearing races may leak past the second seal 436 and exit the swivel joint 100 via the leak detection port.

In conventional swivel joints, when fluid is flowing from left to right through the pipe sections 102, 104 in FIG. 4, a common area of failure is at one or both of the outlet section 326 of the first bore 308 and/or at the outlet face 328. In some examples, fluid passing through the bore 308, as it passes through the expansion formed by the second transition surface 324, contacts the distal end of the outlet section 326. Because the fluid is often corrosive, e.g., including particulates, having a high acidity, or the like, the fluid acts to erode the first pipe section 102 at the outlet section 326. Over time, and in some instances over a short period of time, a thickness of the first pipe section 102 at or proximate the outlet face 328 may significantly decrease, e.g., until a surface of the first seal 434 contacting the outlet face 328 is exposed. Once exposed in this manner, the first seal 434 may further hasten reduction in the thickness of the first pipe section 102 proximate the outlet face 328, e.g., by causing fluid to deflect off the first seal 434 and contact the already-worn surface(s).

Examples of this disclosure may slow, and in some instances, prevent such erosion of the outlet section 326 and/or the outlet face 328. More specifically, as illustrated in FIG. 4, a coating 438 may be applied to the outlet face 328, the outlet surface 326 of the first bore 308, and at least a portion of the second transition surface 324. In examples, the first main bore section 322 is free of the coating 438, as are the annular surface 410, the secondary face 412, and other portions of the male bearing race section 402. In some instances, the second transition surface 324 and/or at least a portion of the outlet surface 326 and/or at least a portion of the outlet face 328 may also be free of the coating 438. In some examples, the coating 438 may be applied only to portions for the outlet surface 326 and/or the outlet face 328 proximate the junction of the outlet surface 326 and the outlet face 328.

In examples, the coating 438 may have an increased hardness relative to the material(s) used to form the remainder of the first pipe section 102 (and, more specifically, the surfaces of the first bore 308). In some instances, the first pipe section 102 (and/or the second pipe section 104 and/or the third pipe section 106) may be formed of iron or an alloy containing iron (such as steel). In these examples, the coating 438 may have a hardness higher than such materials. In addition to a specific hardness, the coating 438 may be characterized by its resistance to corrosion. As described herein, some applications of the swivel joint 100 may include transport of acidic fluids that are highly corrosive. Some example materials for the coating 438 may be metal alloys. For example, the coating 438 may include a metal alloy containing tungsten carbide. In some examples, the coating 438 may also include cobalt and/or chromium. For instance, two known metal alloys that may be used as the coating 438 can include tungsten carbide and cobalt in a ratio of 88% to 12% and tungsten carbide, cobalt, and chromium in a ratio of 86% to 10% to 4%.

In some examples, the coating 438 may be selectively applied to one or more of the outlet face 328, the outlet surface 326, and at least a portion of the transition surface 324, e.g., at the exclusion of other surfaces. In some examples, the coating 438 may be applied using a thermal spray technique such as high velocity oxygen fuel or high velocity air fuel. Other techniques, including but not limited to plasma twin wire arc, may also be used to apply the coating 438 to the identified surfaces. The process may vary based on the type of material used as the first pipe section 102 and/or the type of material used for the coating 438. Any technique that allows for a robust mechanical bond of the coating 438 to the desired surfaces may be used.

In examples, the coating 438 may have a thickness of from about 0.0015 inches to about 0.008 inches. In some examples, the thickness may be from about 0.0025 inches to about 0.0035 inches. Moreover, the coating 438 may have a desired surface finish. For instance, the coating 438 on the outlet face 328 may need a particularly smooth finish, e.g., to ensure adequate sealing of the outlet face 328 by the first seal 434. In some examples, the surface finish of the coating 438 on the outlet face 328 may be no more than about 40 micro inches. The coating 438 on the outlet surface 326 and/or on the transition surface 324 may have the same requirement(s) as for the outlet face 328 or the requirement(s) may be different. In examples, a thermal spray technique such as high velocity air fuel may result in a sufficient surface finish, e.g., without subsequent finishing, polishing, or the like.

By applying the coating 438 to the outlet face 328, the outlet surface 326, and at least a portion of the second transition surface 324, erosion of the inner surface of the first pipe bore 308 may be greatly reduced. However, and as noted above, applying the coating 438 to other surfaces of the swivel joint 100 may have a deleterious effect. For instance, the inventors have found that by applying the coating 438 to the entirety of the second transition surface 324 and/or a portion of the main bore section 322, the coating 438 has a tendency to delaminate or otherwise become dislodged from the surfaces of the first bore 308. For instance, by providing a terminal end of the coating 438 on the inclined transition surface 324, e.g., away from the main bore section 322, such delamination is reduced and/or eliminated. Similarly, applying the coating 438 to other surfaces of the male bearing race section 402 may also have negative effects. For instance, the relatively hard material used for the coating 438 may cause unwanted wear to the bearings 416 and/or to the surfaces in which the races 406, 418 are formed. For example, such wear may occur as the first pipe section 102 moves relative to the second pipe section 104.

While the coating 438 may have negative effects on certain surfaces, the inventors have also found that the coating 438 may have advantageous effects on other surfaces of the swivel joint 410. For example, and as also illustrated in FIG. 4, the coating 438 may also be applied to the inlet face 342, the inlet section 344, and/or the transitional section 346 of the second pipe section 104. However, the coating 438 may be excluded from the second main bore 330. For instance, should the swivel joint be used to pass fluids in an opposite direction, e.g., from the second pipe section 104 to the first pipe section 102, the same erosion issue described above may occur at one or both of the inlet face 342 and/or the inlet section 344.

Returning to FIG. 3, it will be appreciated that the coating 438 may be applied to other, similar surfaces at other locations in the swivel joint 100. For instance, to the extent that the second junction 110 is substantially identical to the first junction 108, the coating 438 may be similarly applied to surfaces proximate the outlet 336 of the second pipe section 104 and the inlet 358 of the third pipe section 106. By way of non-limiting example, the coating 438 can be applied to one or more of the transition section 350, the outlet section 352, the outlet face 354, the inlet face 366, the inlet section 368, and/or the transition section 370.

Also by way of nonlimiting example, FIG. 3 also shows the coating 438 applied on the first inlet face 316 and the first transition surface 320, e.g., at the inlet 302. Generally, in implementations of this disclosure, the coating 438 may be applied on at least a portion of any or all faces (e.g., surfaces that are substantially perpendicular to a directional flow), surfaces adjacent (or sharing an edge with) such faces, transitional surfaces (e.g., surfaces that are angled in cross-section to provide a reduction or widening of a diameter of a bore), and/or surfaces adjoining the transitional surfaces and spaced from a main bore (e.g., surfaces having a diameter larger or smaller than a main bore diameter).

Figure 5:
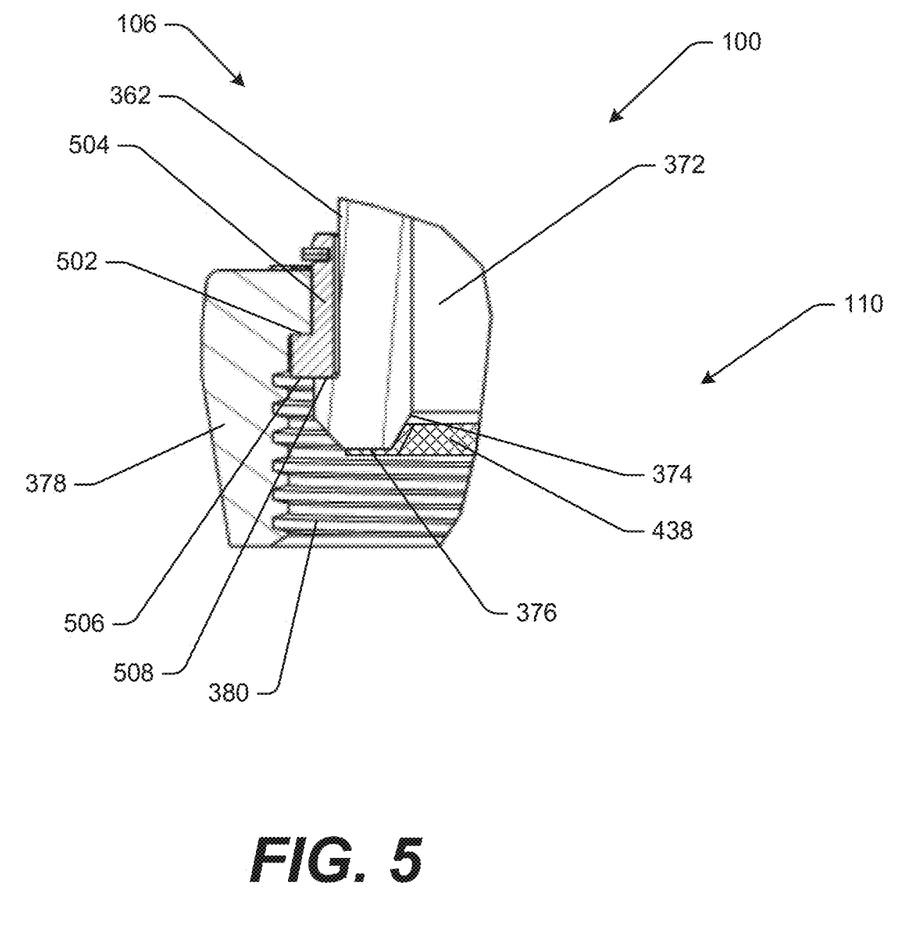
FIG. 5 is another detailed view of another portion of the swivel joint of FIG. 3, in accordance with an example embodiment of the present disclosure.

As illustrated in FIG. 5, the coating 438 may also be applied to the outlet face 376 and at least a portion of the transition surface 374 of the third pipe section 106. More specifically, FIG. 5 is an enlarged view of a portion of the third pipe section 106 identified by the section arc 5-5 in FIG. 3, proximate the outlet 304.

FIG. 5 also illustrates the example second connection structure in more detail. For example, the nut 378 may include a step 502 configured to contact a flanged collar 504. Moreover, a bottom surface 506 of the collar 504 may contact a flange or protuberance 508 on the third pipe section 106. As the nut 378 is threaded onto a mating hose, line, or other piece of equipment, the collar 504 tightens around the outer surface 362 of the third pipe section 506. For example, the collar 504 may comprise a plurality of arcuate pieces that together surround substantially the entire outer diameter of the outer surface 362.

Figure 6:
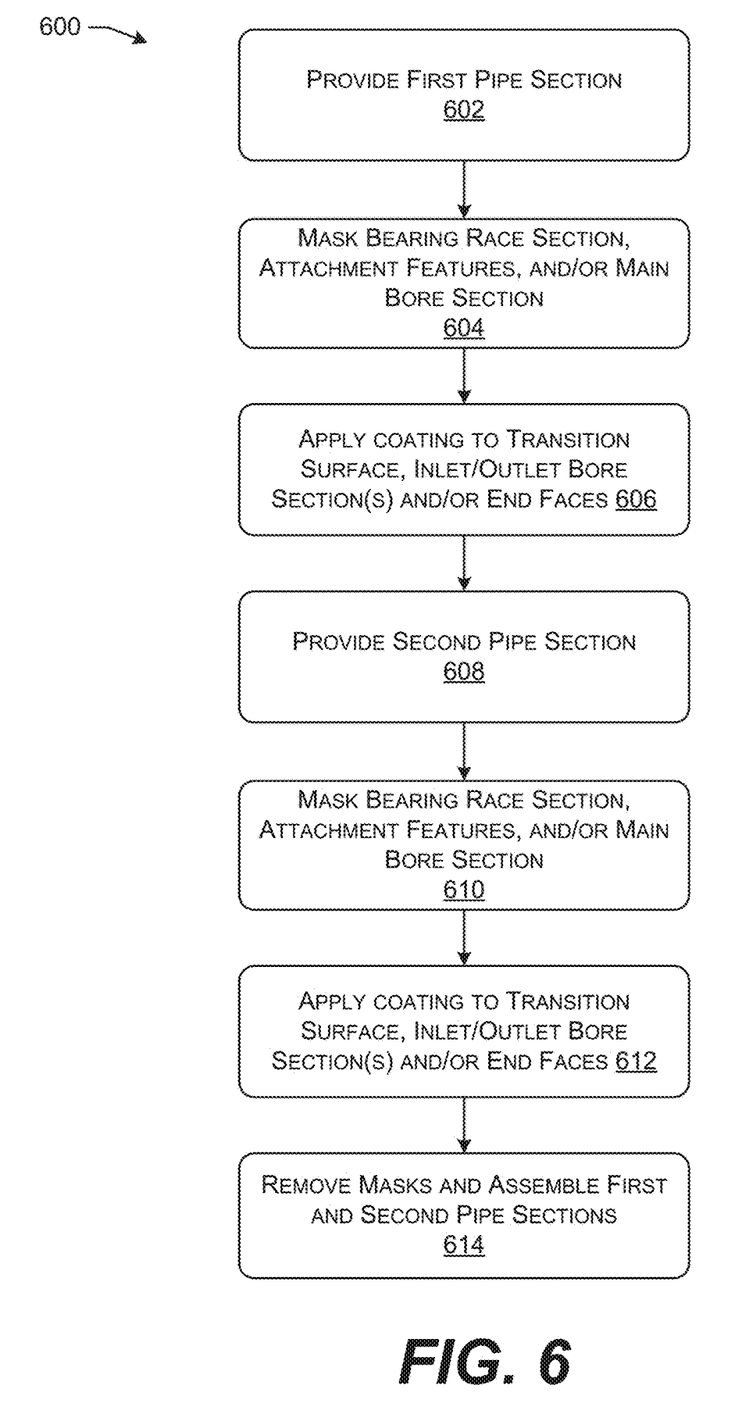
FIG. 6 is a flowchart illustrating a method of manufacturing a swivel joint, in accordance with an example embodiment of the present disclosure.

FIG. 6 illustrates an example method 600 of manufacturing the swivel joint 100. As discussed further herein, the swivel joint 100 may be better suited to resist corrosion, erosion, and/or abrasion than conventional swivel joints and may be cost effective to produce. The method 600 shows some example steps for achieving such benefits.

Specifically, at operation 602, the method 600 includes providing a first pipe section. As described herein, the first pipe section may be a generally tubular section of pipe, which may be generally straight, generally arcuate, and/or have a combination of straight and arcuate sections. In examples described herein, the first pipe section may be the first pipe section 102, the second pipe section 104, the third pipe section 106, and/or some other pipe section. The pipe section may also include a bearing race section, which may be the male bearing race section 402 or the female bearing race section 414 described herein. The first pipe section may also define a bore that includes a main bore section having a first diameter and one or more sections e.g., proximate distal ends of the pipe section having a generally larger diameter than the main bore section. One or more transition sections may also be provided between the main bore section and the sections having the larger diameter.

At 604, the method 600 includes masking the bearing race section, attachment features, and/or the main bore section of the first pipe section. For example, the first main pipe section 102 may include the male bearing race section 402 having the races 406 and/or additional features, such as the notch 408. At 604, one or more of these elements, and/or the main bore 322 may be masked. In some examples, a mask may include a masking compound, tape, or the like, to which the coating 438 will not adhere and/or that is readily removable with the coating 438 adhered thereto. In some examples, the mask may include a metal, a polymer, and/or an alloy.

At 606, the method 600 includes applying the coating to the transition surface, the inlet/outlet bore section(s), and/or the end face(s). For example, in the example of FIG. 4, the operation 606 may include applying the coating 438 to the outlet face 328, the outlet section 326 and at least a portion of the transition surface 324. In some instances, the coating 438 may be a metal alloy powder applied using a thermal spray technique, such as high velocity air fuel. In some examples, the coating 438 can include a metal alloy powder including tungsten carbide.

At 608, the method 600 includes providing a second pipe section. For example, the second pipe section may be a pipe section configured to have a bearing race section configured to cooperate with the bearing race section of the first pipe section provided at operation 602. In the example of FIG. 4, the first pipe section may be the first pipe section 102 and the second pipe section may be the second pipe section 104. In that example, the second pipe section 104 includes the female bearing race section 414. As will be appreciated, in other examples, the first pipe section provided at the operation 602 may be the second pipe section 104, and the second pipe section provided at the operation 608 may be either the first pipe section 102 or the third pipe section 106. Of course, these are for example only. However, in the context of FIG. 6, the first pipe section and the second pipe section should include corresponding bearing race sections, as described further herein.

At 610, the method 600 can optionally include masking the bearing race section, attachment feature(s), and/or a main bore section of the second pipe section. The operation 610 may be substantially identical to the operation 604 and is not described further herein.

At 612, the method 600 can optionally include applying the coating to the transition surface(s), the inlet/outlet bore section(s) and/or the end face(s) of the second pipe section. The operation 612 may be substantially identical to the operation 606 and is not described further herein.

At 614, the method 600 includes removing masks and assembling the first and second pipe sections. For example, and with reference to FIG. 4, the first and second pipe sections 102, 104 may be assembled by inserting the first seal 434 into contact with the inlet face 342 of the second pipe section 104, and inserting the second seal 436 into contact with the secondary face 428 of the second pipe section 104. The operation 614 can also include inserting the male bearing race section 402 of the first pipe section 102 into the female bearing race section 414 of the second pipe section 104. The operation 614 can also include inserting the bearings 420 through the bearing apertures 116, inserting the bearing blocks 422 into position over the bearing races 406, and securing the bearing blocks 422 with the bearing retainers 424.

The method 600 allows for cost-effective and efficient manufacture of an improved swivel joint, as detailed herein. For instance, because selected surfaces are coated, the swivel joint 100 may be more resistant to corrosion, erosion, and/or abrasion. Moreover, the masking techniques ensure that critical areas that could be harmed by the presence of the coating 438 remain free of the coating. While the method may include an additional step, e.g., the coating step, compared to conventional fabrication, the coating can meaningfully increase life expectancy of the swivel joint.

INDUSTRIAL APPLICABILITY

The present disclosure provides an improved swivel joint and methods of making the swivel joint. The swivel joint may be used in a variety of applications. For example, the swivel joint may be used in gas, oil, and fracking applications. The swivel joint may be particularly useful in high pressure applications and/or with fluids containing abrasive particles. The disclosed swivel joint may be in use for extended periods of time before failing and/or requiring replacement, which can result in a decrease in down time for fluid system and/or reduce maintenance time and expense. Moreover, the manufacturing methods described herein may result in a cost-effective solution to previous shortcomings in the art.

According to some embodiments, a swivel joint 100 may include a coating 438 on one or more faces that are perpendicular to a fluid flow, to surfaces proximate those faces, and/or to one or more transition surfaces that create an expansion or reduction in bore diameter. By selectively applying the coating to one or more of these surfaces, the useful life of the swivel joint may be significantly increased. Moreover, by purposefully excluding the coating from other surfaces, deleterious effects can be avoided.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof

What is claimed is:

1. A swivel joint comprising:
a first pipe section comprising:
a first pipe inlet;
a first pipe outlet;
a first pipe outlet face circumscribing the first pipe outlet;
a first pipe bore extending from the first pipe inlet to the first pipe outlet, the first pipe bore including:
a first pipe outlet section proximate the first pipe outlet and having a first pipe outlet diameter,
a first pipe main bore section between the first pipe inlet and the first pipe outlet section and having a first pipe main bore diameter smaller than the first pipe outlet diameter, and
a first transition section extending between the first pipe main bore section and the first pipe outlet section; and
a first bearing race section proximate the first pipe outlet;
a second pipe section comprising:
a second pipe inlet;
a second pipe outlet;
a second bearing race section proximate the second pipe inlet and configured to cooperate with the first bearing race section of the first pipe section to allow rotation of the first pipe section relative to the second pipe section;
a seal disposed between and in contact with the first pipe outlet face and a second pipe inlet face circumscribing the second pipe inlet; and
a coating bonded to at least one of the first pipe outlet face, the first pipe outlet section, and at least a portion of the first transition section, the first pipe main bore section and the first bearing race section being substantially free of the coating.

2. The swivel joint of claim 1, wherein the coating is a metal alloy.

3. The swivel joint of claim 2, wherein the metal alloy is powdered metal alloy and the coating is a thermal spray coating.

4. The swivel joint of claim 3, wherein the metal alloy comprises one or more of tungsten carbide, cobalt, and chromium.

5. The swivel joint of claim 1, wherein the coating is from about 0.0015 inches to about 0.008 inches thick.

6. The swivel joint of claim 1, the first pipe section further comprising a first pipe inlet face circumscribing the first pipe inlet, and the first pipe bore further comprising at least one of a first pipe inlet section or a second transition section disposed between the first pipe main bore section and the first pipe inlet,
wherein the coating is further disposed on at least one of the first pipe inlet face, the first pipe inlet section or at least a portion of the second transition section.

7. The swivel joint of claim 6, further comprising a connection mechanism proximate the first pipe inlet.

8. The swivel joint of claim 7, wherein the connection mechanism comprises one or more internal threads or one or more external threads.

9. The swivel joint of claim 1, the second pipe section further comprising a second pipe bore extending from the second pipe inlet to the second pipe outlet, wherein the second pipe bore comprises:
a second pipe inlet section proximate the second pipe inlet and having a second pipe inlet diameter;
a second pipe main bore section extending between the second pipe inlet section and the second pipe outlet and having a second pipe main bore diameter smaller than the second pipe inlet diameter; and
a second transition section extending between the second pipe inlet section and the second pipe main bore section,
wherein the coating is disposed on at least one of the second pipe inlet face, the second pipe inlet section or on at least a part of the second transition section, the second pipe main bore section being substantially free of the coating.

10. A pipe section for use in a swivel joint, the pipe section comprising:
a pipe inlet;
a pipe outlet;
a pipe outlet face circumscribing the pipe outlet;
a pipe bore extending from the pipe inlet to the pipe outlet, the pipe bore including:
a pipe main bore section extending at least partially between the pipe inlet and the pipe outlet, and
an outlet section extending between the pipe main bore section and the pipe outlet;
a bearing race section proximate the pipe outlet, the bearing race section being configured to cooperate with a bearing race section of another pipe section; and
a coating bonded to the pipe outlet face and at least a portion of the outlet section, wherein the pipe main bore section and the bearing race section are substantially free of the coating.

11. The pipe section of claim 10, the coating being further on a pipe inlet face circumscribing the pipe inlet and at least a portion of a pipe inlet section extending from the pipe inlet to the pipe main bore section.

12. The pipe section of claim 10, wherein the coating is a thermal spray coating comprising a metal alloy powder.

13. The pipe section of claim 12, wherein the thermal spray coating is applied using a high velocity air fuel thermal spray process and the metal alloy powder comprises at least one of tungsten carbide, cobalt, or chromium.

14. The pipe section of claim 10, wherein the pipe main bore section has a pipe main bore diameter smaller than a diameter of the outlet section.

15. A method of manufacturing a first pipe section for use in a swivel joint, the first pipe section including a first bearing race configured to cooperate with a second bearing race of a second pipe section to allow for rotational movement of the first pipe section relative to the second pipe section, the first pipe section comprising a first pipe inlet; a first pipe outlet; a first pipe bore extending from the first pipe inlet to the first pipe outlet; and a first pipe outlet face circumscribing the first pipe outlet, the first pipe bore including: a first pipe outlet section proximate the first pipe outlet and having a first pipe outlet diameter, a first pipe main bore section between the first pipe inlet and the first pipe outlet section and having a first pipe main bore diameter smaller than the first pipe outlet diameter, and a first transition section connecting the first pipe main bore section and the first pipe outlet section, the method comprising:
 applying a coating to the first pipe outlet face;
 applying the coating to the first pipe outlet section; and
 applying the coating to at least a portion of the first transition section,
 wherein the applied coating is bonded to the first pipe outlet face, the first pipe outlet section, and at least the portion of the first transition section, and
 wherein the first pipe main bore section and the first bearing race are substantially free of the coating.

16. The method of claim 15, wherein the coating comprises a metal alloy and applying the coating comprises depositing the metal alloy via a thermal spray.

17. The method of claim 16, wherein the thermal spray comprises high velocity air fuel.

18. The method of claim 15, further comprising:
 masking at least one of the first pipe main bore section or at least a portion of the first bearing race.

19. The method of claim 15, wherein the applying the coating comprises applying the coating to a thickness of from about 0.0025 inches to about 0.0035 inches.

* * * * *